(12) United States Patent
Schwarz et al.

(10) Patent No.: US 10,120,358 B2
(45) Date of Patent: Nov. 6, 2018

(54) ENERGY SYSTEM AND METHOD FOR CONTROLLING LOAD BALANCING THEREIN

(71) Applicant: NEC EUROPE LTD., Heidelberg (DE)

(72) Inventors: Maja Schwarz, Heidelberg (DE); Dimitrios Chalastanis, Sindelfingen (DE); Anett Schuelke, Gaiberg (DE)

(73) Assignee: NEC CORPORATION, Tokyo (JP)

( * ) Notice: Subject to any disclaimer, the term of this patent is extended or adjusted under 35 U.S.C. 154(b) by 214 days.

(21) Appl. No.: 15/102,536

(22) PCT Filed: Dec. 10, 2013

(86) PCT No.: PCT/EP2013/076091
§ 371 (c)(1),
(2) Date: Jun. 8, 2016

(87) PCT Pub. No.: WO2015/086046
PCT Pub. Date: Jun. 18, 2015

(65) Prior Publication Data
US 2016/0334768 A1 Nov. 17, 2016

(51) Int. Cl.
*G05B 19/042* (2006.01)
*G06Q 50/06* (2012.01)

(52) U.S. Cl.
CPC .......... *G05B 19/042* (2013.01); *G06Q 50/06* (2013.01); *G05B 2219/2639* (2013.01);
(Continued)

(58) Field of Classification Search
CPC . G05B 2219/2639; Y02E 40/76; Y02S 10/54; Y02S 10/545
See application file for complete search history.

(56) References Cited

U.S. PATENT DOCUMENTS

| 9,246,334 B2 * | 1/2016 | Ansari | H02J 13/0013 |
| 2002/0103745 A1 * | 8/2002 | Lof | G06Q 40/04 |
| | | | 705/37 |

(Continued)

OTHER PUBLICATIONS

Derin et al; Scheduling energy consumption with local renewable micro-generation and dynamic electricity prices; Apr. 2010; First Workshop on Green and Smart Embedded System Technology Infrastructures, Methods, and Tools; 6 pages.*

*Primary Examiner* — Mark A Connolly
(74) *Attorney, Agent, or Firm* — Leydig, Voit & Mayer, Ltd.

(57) ABSTRACT

A method controls load balancing within an energy system that includes a renewable energy source for sharing local renewable energy consumption between a predetermined number of users who operate time delay-tolerant loads and a back-up energy source for providing back-up energy. Use cases of appliances of the users are defined by power profiles that are in each case based on a duration and energy consumption of a task or an array of subtasks. One or more use cases has a user specified deadline. A scheduler, in a first level, performs a control of load balancing by scheduling or time-shifting use of the loads so as to provide a start time assignment for each of the tasks or sub tasks based on a maximization of the local renewable energy consumption among the users. The scheduler, in a second level, assigns the renewable energy to the appliances using the start time assignments.

13 Claims, 3 Drawing Sheets

(52) U.S. Cl.
CPC ................ *Y02E 40/76* (2013.01); *Y04S 10/54* (2013.01); *Y04S 10/545* (2013.01)

(56) References Cited

U.S. PATENT DOCUMENTS

| | | | | |
|---|---|---|---|---|
| 2010/0174643 | A1* | 7/2010 | Schaefer | G06Q 20/102 |
| | | | | 705/40 |
| 2011/0055036 | A1* | 3/2011 | Helfan | G06Q 30/04 |
| | | | | 705/26.1 |
| 2012/0209442 | A1* | 8/2012 | Ree | H04L 12/2803 |
| | | | | 700/295 |
| 2012/0215725 | A1* | 8/2012 | Imes | F24F 11/006 |
| | | | | 705/412 |
| 2015/0039145 | A1* | 2/2015 | Yang | H02J 3/00 |
| | | | | 700/291 |
| 2015/0372485 | A1* | 12/2015 | Borean | G01D 4/00 |
| | | | | 700/275 |

* cited by examiner

ENERGY SYSTEM AND METHOD FOR CONTROLLING LOAD BALANCING THEREIN

CROSS-REFERENCE TO PRIOR APPLICATION

This application is a U.S. National Stage Application under 35 U.S.C. § 371 of International Application No. PCT/EP2013/076091 filed on Dec. 10, 2013. The International Application was published in English on Jun. 18, 2015 as WO 2015/086046 A1 under PCT Article 21(2).

FIELD

The present invention relates to a method for controlling load balancing within an energy system, wherein a renewable energy source for sharing local renewable energy consumption between a predetermined number of users is provided, wherein a back-up energy source for buying back-up energy by the users is provided for situations when the energy demand of the users exceeds the availability or a predetermined availability level of renewable energy from the renewable energy source, wherein the users operate time delay-tolerant loads and wherein a control of load balancing by scheduling and/or time-shifting the use of the loads is performed.

Further, the present invention relates to an energy system, wherein a renewable energy source for sharing local renewable energy consumption between a predetermined number of users is provided, wherein a back-up energy source for buying back-up energy by the users is provided for situations when the energy demand of the users exceeds the availability or a predetermined availability level of renewable energy from the renewable energy source, wherein the users operate time delay-tolerant loads and wherein means for performing a control of load balancing by scheduling and/or time-shifting the use of the loads are provided.

BACKGROUND

The aim for a more sustainable society demands high penetration of Renewable Energy Sources, RES, in all domains, including the residential sector. Furthermore, recent technology improvements made various renewable energy systems more available and easier to deploy, even in urban areas. Residential RES systems have been encouraged through guaranteed feed-in, leading to a high number of installed Photovoltaic panels in the residential sector. Furthermore, small-scale wind turbines that can be installed in urban zones have also become available in the market.

The high penetration of Distributed Energy Resources, DER, presents an issue for the stability of electricity grids which can be mitigated by local consumption of the generated energy. Also, local use of renewable energy should be favoured over feed-in since it results in higher efficiency. Moreover, the trends show that this will also be economically the most desirable option due to a decrease in feed-in rates—that are sometimes not available at all—and the emergence of grid-parity systems. The local consumption of energy is also motivated by the independence from the grid and devotion to green energy.

The main challenge with local consumption of renewable energies is how to match fluctuating supply and demand. Various approaches to balance between an intermittent energy source and power loads have been proposed. In the residential sector, a very common strategy is to shift in time the use of delay-tolerant appliances based on the availability of renewable energy.

The load balancing problem becomes more complicated once the demand comes from multiple users, requiring a certain form of fairness. Different notation of fairness for shared resources can be defined. For instance, with proportional-share fairness users are supposed to get the shared resource—here renewable energy—proportionally to their shares in the system. However, this type of fairness is not suitable for loads such as home appliances which operate only if they get the entire required amount of power equal to their power consumption. Another type of fairness can be defined as delay-fairness which considers the wait times experienced by users.

Usual practice with delay-tolerant loads is that a user submits a request together with a deadline until which the appliance should finish. These deadlines are hard deadlines meaning that the appliance must finish by the requested timestamp even if in that case additional grid energy has to be consumed. Contrary to renewable energy that is free after the initial investments, the additional grid energy comes at the price charged by the utility. Electricity pricing schemes may still differ from country to country but a general trend towards dynamic electricity pricing is obvious. With the electricity market deregulation and penetration of renewable energy at grid scale, a widely accepted view is that in future electricity price will depend on time of use, matching supply and demand. In this way residential customers would get a day-ahead "menu" with electricity prices changing every 15-30 min. Some variations of this pricing scheme are already in use.

Currently, users rarely actively share a renewable energy source in developed countries. For instance, in Germany there are still feed-in tariffs that are more profitable than local use of energy. However, this is going to change, Fulton et al., *The German feed-in tariff: Recent policy changes*. Furthermore, there are countries where neither this tariffs nor net-metering are available and the energy is consumed locally. For installation of renewable systems in residential building, not only a load balancing that minimizes additional costs is needed, what is provided by the current state of the art.

Contrary to developed countries, shared renewable systems used locally within a community are more frequent. Social studies show that a certain type of control over a use of particular users is desired, Jenny et al., *Psychological factors determining individual compliance with rules for common pool resource management: The case of a Cuban community sharing a solar energy system*.

SUMMARY

In an embodiment, the present invention provides a method for controlling load balancing within an energy system. A renewable energy source for sharing local renewable energy consumption between a predetermined number of users who operate time delay-tolerant loads and a back-up energy source for providing back-up energy in situations in which an energy demand of the users exceeds an availability or a predetermined availability level of renewable energy from the renewable energy source. Use cases of appliances of the users are defined by power profiles that are in each case based on a duration and energy consumption of a task or an array of subtasks. One or more use cases has a user specified deadline. A scheduler, in a first level, performs a control of load balancing by scheduling or time-shifting use of the loads so as to provide a start time assignment for each of the tasks or subtasks based on a maximization of the local renewable energy consumption among the users. The scheduler, in a second level, assigns the renewable energy to the appliances of the users using the start time assignments.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
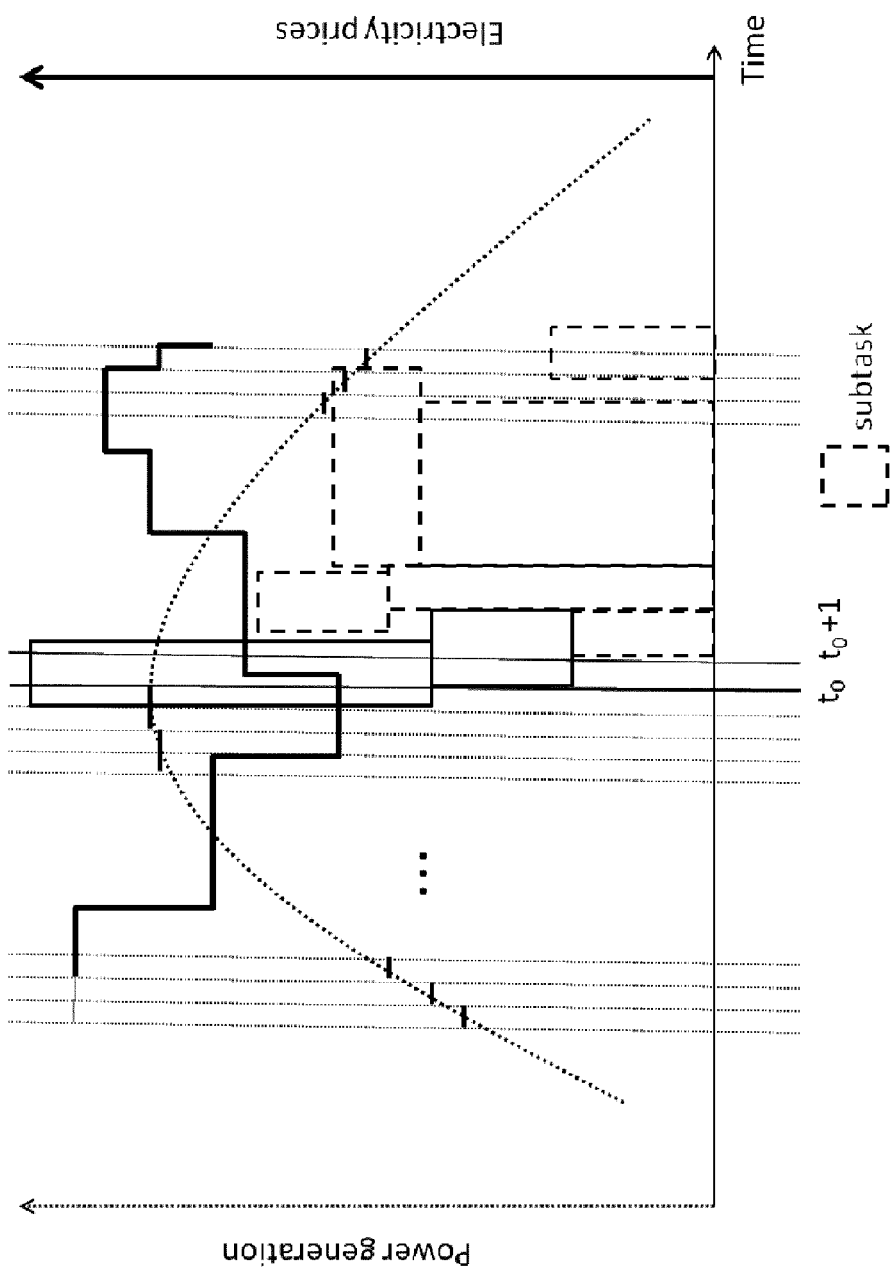
FIG. 1 is illustrating the scheduling of delay-tolerant loads considering renewable power generation and utility electricity prices according to one embodiment of the present invention.

In an embodiment, the present invention provides a method for controlling load balancing within an energy system and an according energy system for allowing to schedule delay-tolerant power loads from multiple users sharing a single renewable energy source, so that the renewable energy is nearly optimally used and power allocation is fair between the users.

According to an embodiment, the method provides that the control of load balancing is performed under consideration of a maximization of the users' local renewable energy consumption and under consideration of cost-fairness between the users regarding the assignment of the renewable energy to the users and regarding the buying and/or prices of back-up energy from the back-up energy source.

According to another embodiment, the energy system includes means that are designed for performing the control of load balancing under consideration of a maximization of the users' local renewable energy consumption and under consideration of cost-fairness between the users regarding the assignment of the renewable energy to the users and regarding the buying and/or prices of back-up energy from the back-up energy source.

According to an embodiment of the invention it has been recognized that a very important and suitable notation of fairness for users is cost-fairness. The combination of maximization of the users' local renewable energy consumption with such cost-fairness aspects results in a very sustainable notation of fairness and allocation of generated renewable energy.

Within a preferred embodiment of the method a use case of a load, a device or a machine, for example, is described by its power profile given as a task or an array of subtasks specified by its or there durations and energy consumptions. Particularly such an array of subtasks can be scheduled in a very flexible and simple way.

Depending on individual limitations regarding the duration of a special use case at least one or each use case can have a user specified deadline. This will consider use cases, where time-shifting can not be performed within a too wide range.

Also depending on the individual use case and for providing a flexible scheduling a duration or a minimal duration or a maximal duration of a pause between at least two subtasks of a use case can be defined. For instance, a washing phase of a washing machine must start not longer than about fifteen minutes after the heating phase during the washing process.

For providing very actual situations and a best possible control of load balancing under consideration of maximization of renewable energy consumption and cost-fairness the scheduling and/or time-shifting can be done periodically at an adjustable frequency. By each new scheduling and/or time-shifting the consideration of changed circumstances is possible in this case.

For providing a very sensible scheduling and/or time-shifting the scheduling and/or time-shifting can be done at the level of the above subtasks.

Further, for providing a very fair load balancing future back-up energy prices or dynamic back-up energy pricing schemes can be considered within the scheduling and/or time-shifting.

Additionally or alternatively, prediction or forecast of renewable energy generation of the renewable energy source can be considered within the scheduling and/or time-shifting.

With regard to a very simple performance of the method the method can be performed in a first level and in a second level, wherein different processes and aspects can be realized or considered within said levels.

The first level can provide the scheduling and/or time-shifting of the task or subtasks. Concretely, the scheduling and/or time-shifting can provide a start time assignment for each task or subtask. This scheduling and/or time-shifting is performed under consideration of the maximization of the users' local renewable energy consumption. This maximization can be performed within first level.

The second level can provide the assignment of the renewable energy to the users or tasks or subtasks. This concrete assignment can consider the start time assignment for each task or subtask.

Generally, the assignment of the renewable energy can be performed over a definable time interval. Such a time interval can be defined by the user.

Within such a two-level structure the second level can consider the cost-fairness between the users. A measure of cost-fairness and/or the assignment provided within the second level can then be considered within the first level. In this regard the first level can amend a prior scheduling and/or time-shifting scheme after consideration of such measure of cost-fairness and/or assignment of the renewable energy by the second level, so that the first and the second level can preferably be completely interleaved.

With regard to a simple and reliable realization of the processes within the first level and/or second level genetic algorithms can be used within the first and/or second level.

Within a concrete embodiment cost-fairness can comprise the meaning that users with generally equal shares or with generally equal assigned amounts of renewable energy pay on average the same or comparable back-up energy prices. By such a meaning a very sustainable notation of fairness can be provided.

Within a further concrete embodiment users that consumed less renewable energy than other users can get lower prices for back-up energy than the other users. In this way a balance regarding costs can be provided between the users.

Within a further preferred embodiment loads requiring an immediate start can be considered within the scheduling and/or time-shifting. By this feature an universally usable method can be provided.

Preferred aspects of embodiments of the above mentioned method and energy system can be explained as follows:

If dynamic electricity pricing is assumed and grid energy is needed to complement the renewable generation, a central question here is how the available renewable energy is allocated to the users and whose appliances are scheduled during periods of low electricity price. In this way, we come to another notation of fairness—cost-fairness. Though some variations of the definition are possible, with cost-fairness we assume that in general users with equal shares in the system should pay on average comparable prices for kWh of energy used from the grid. It's also possible to achieve lower grid energy price for users that consumed less renewable energy.

Conditions:
  Under insufficient power generation, additional energy can be fetched from the grid at dynamically changing prices that are known in advance.
  It is possible to obtain prediction of power generation, e.g. solar irradiance.
  The assumed power loads are delay-tolerant loads with user specified hard deadlines.

However, note that under given assumptions, the method and system can also manage a certain portion of loads that have to start immediately, selecting for the deadline duration of the appliance use. These loads are not flexible in time but they still need to be considered for fair renewable power allocation.

Here it is proposed a control method for load balancing in an energy sharing system that maintains cost-fairness among competing users. In the discussed system, users share a renewable energy source with back-up energy bought from the utility in situations when demand exceeds supply. The price of electricity bought from the utility can change dynamically, varying depending on time of use. The proposed balancing method schedules power load that includes delay-tolerant appliances using an optimization approach. The objective of this approach is to maximize local consumption of renewable energy and cost-fairness. Cost-fairness is closely related to the execution schedule since the user needs to pay current electricity price for the portion of his/her power consumption that is not covered by the renewable energy assigned to the user. Furthermore, the method aims at minimization of the total costs paid to the utility.

An embodiment of the method refers to a control method for load balancing for local shared energy supply system distributed to multiple competing users performing the power assignment through an optimization of high utilization of energy sources—control level 1—and cost-fairness between users—control level 2.

The method can comprise a time-shifting control by delay-tolerant loads with user specified deadlines. The energy system should preferably consider the following conditions:
  Certain portion of load can require immediate start
  A fluctuating sharable power source with generation forecast (prediction)
  Stochastic demand from multiple competing users
  Grid-connected system with a dynamic energy pricing scheme.

The method can assign the available power to the loads active over a specified interval. An optimization-based rescheduling or re-time-shifting can be done periodically in order to consider newly arrived jobs or loads.

The method schedules in time the use of loads or appliances aiming at an optimal local consumption of the available renewable energy and minimization of additional utility costs. The combination of time schedule and power assignments determines the costs to be paid by each user. The method maintains a certain form of cost-fairness.

It is provided a control method for supply-demand balancing combining the goal for maximizing efficiency of local supply utilization with the goal for providing cost-fairness under participants or users. The control method performs nested optimization of the different goals:
  Providing a form of cost-fairness among all users
  Maximizing the utilization of local energy supply, RES
  Minimizing additional energy costs.

The prediction of renewable energy generation and dynamic electricity pricing schemes can be used as an input. The dynamic adjustment of schedules depending on changes in the load provides an impact on load processing.

As the results, users are motivated to provide flexible/ loose deadlines knowing that it directly affects their bill. In this way providing a short deadline would affect only the very user and not others as it would be the case with schemes that would share electricity costs proportionally to consumption or according to any other user agreements.

Operational configuration of the method can be given by:
  Scheduling at the level of subtasks provides flexibility to achieve good balancing capabilities and high degree of fairness.
  Possibility to select the exact notation of cost-fairness, for instance, smaller users should pay less per kWh of energy on average, or all users should pay similar price per kWh; furthermore additional parameters can be introduced such as users' shares in the system.

The above mentioned method and energy system is influenced by an imbalance of supply and demand due to intermittent and/or resource-limited energy generation and fluctuating demand/load pattern. The local balancing system is backed-up by an energy system which can be characterized by dynamic energy pricing schemes.

In this way, users are motivated to provide loose deadlines since their costs are directly effected by the time of use of energy if additional energy needs to be fetched from the utility.

Furthermore, deadline/demand of a given user can affect other users only if the user's accumulated "benefit" is lower, otherwise other users will have higher priority to use energy when it is cheaper and will also get a higher fraction of the renewable generation.

In a preferable way the scheduling and/or time-shifting and/or prediction of costs can be provided in accordance with previous cost and/or consumption patterns of users or loads. This can result in a high utilization degree of the renewable energy source.

The above method and energy system provide an economical method and system, as energy costs paid to the back-up energy system can be minimized. Further, cost variations between competing users can be minimized for providing cost-fairness. Further, there is a social impact by the above mentioned method and energy system, as user behaviour can be modified, as users are motivated to take responsibility for their behaviour by provision of loose deadlines.

According to embodiments of this invention, a control method performing optimization on sharing and cost-fairness for balancing of local supply and demand is provided. The control method facilitates high efficient local consumption of energy from a renewable energy source shared among multiple users. This method performs load balancing by time-shifting of delay-tolerant loads like washing machines, dishwashers and tumble dryers. Load balancing is optimization-based, aiming at optimal or best possible use of locally generated energy.

In the following text, we refer to one use of an appliance as a job. A job is described by its power profile given as an array of subtasks specified by their durations and power consumptions. Furthermore, each job has a user specified deadline and there might be constraints for the maximal pause between subtasks of a given job. For instance, washing phase must start not longer than 15 minutes after the heating phase during washing process. Also, each job belongs to one of the system users.

The optimization-driven scheduler is invoked periodically at adjustable frequency. Every time the scheduling algorithm is used, all unexecuted subtasks are scheduled or rescheduled including both previously scheduled subtasks and newly arrived jobs. FIG. 1 illustrates the idea of periodical rescheduling considering newly arrived jobs, future electricity prices and a prediction of local power generation. At the moment $t_0$, an optimization process is done on the space of all possible subtask schedules. Note that already running subtask—represented by full lines—can not be pre-empted and accordingly, they cannot be rescheduled. Once the suboptimal solution for all waiting subtasks is found, the subtasks that have been waiting continue according to the new schedule. Again, the subtasks that start immediately will not be affected by the new scheduling decisions made at the moment $t_0+1$—rectangles represented by full lines. All other subtasks that are still waiting for execution—represented by dotted lines—can get different start times assigned, depending on job arrivals between $t_0$ and $t_0+1$.

Figure 2:
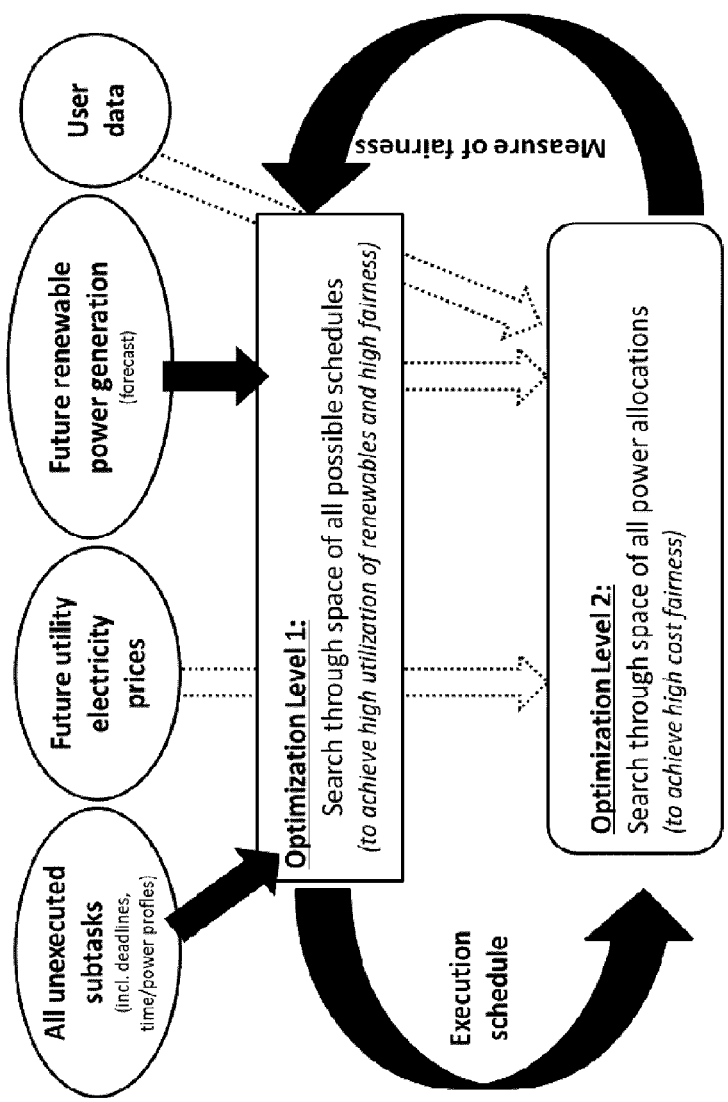
FIG. 2 is illustrating a two-level optimization approach according to one preferred embodiment of the present invention and FIG. 3 is illustrating the need for assignment of available energy to subtasks active during a time interval.

The control method is a two-level method as depicted in FIG. 2. We decompose the problem into two, since the search space with all control variables considered here would be too large to solve it in a reasonable time. Furthermore, the problem can be naturally decomposed into multiple ones because of different goals that we want to achieve—subtask scheduling and power allocation to competing users.

The goal of the first method level is high utilization of locally generated energy. Accordingly, the first level of optimization searches for a schedule that maximizes the use of renewable energy:

A schedule here means a start time assignment for each pending subtask such that all deadline constraints are satisfied.

Inputs of this level are the subtasks and their requirements, as well as a generation forecast. In this way, at this level the percentage of load served from renewable energy can be computed for each schedule.

Each evaluated schedule—a feasible solution—is passed on to the second level of optimization.

The second level of the control method assigns the available renewable energy to all active subtasks over each considered interval until the end of the last subtask according to the schedule. This control step takes care for cost-fairness under all users.

An interval can represent a period of 5-15 minutes that could coincide with the scheduling or rescheduling frequency. If over an interval, demand is higher than generation then the entire amount of renewable energy will be assigned to subtasks—users—and the rest of energy needed by the subtasks will be provided by the utility.

Figure 3:
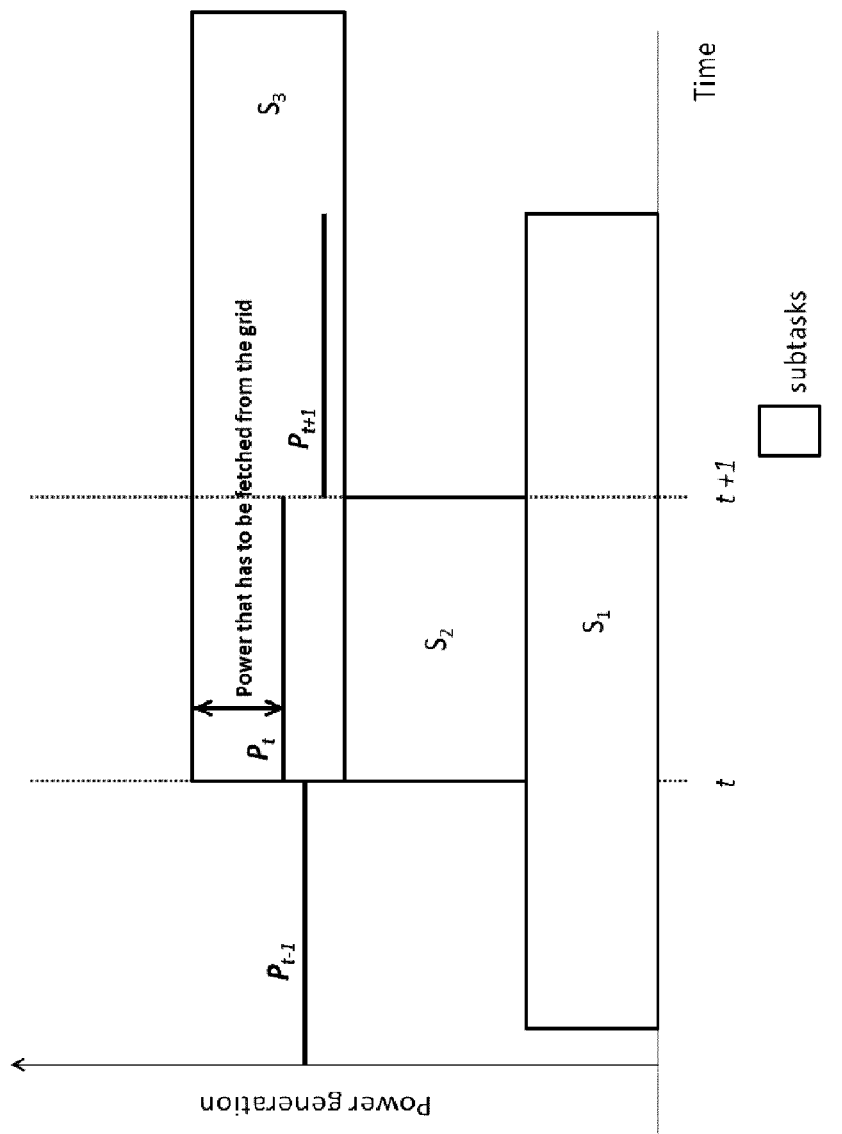

At this level of optimization, the number of control variables is equal to the sum of subtasks active over each interval. Each control variable $P_k^t$ represents how much renewable power is assigned to the subtask k over the interval t. If this amount is lower than required, the user that is the owner of the job, has to obtain the remaining amount of energy from the utility at price valid during the interval t. FIG. 3 depicts power demand and generation over an interval.

This level of the control method takes care to respect cost-fairness under all users. It does not change the schedule itself—given via subtask start times—, but aims to achieve (sub)-optimal or best possible cost-fairness for a given schedule. The measure of fairness is returned to the Control Level 1 and there considered together with the efficiency of use of renewables and the total schedule cost. The total schedule cost should be also considered with a certain weight in order to avoid scenarios in which a job that can run during a period of lower prices is scheduled for a period of high prices just to balance fairness among users. This should not happen, since it does not come from user competition and has no positive effect on users that have benefited less in past. Also, between schedules with the same degree of fairness and efficiency, cheaper ones should be preferred. With the output from Control Level 2, optimization search is continued in Control Level 1 until the specified computation time elapses or until a satisfying solution is found.

According to a preferred embodiment the objective function of the Control Level 1 can be formulated as follows:

$$\text{Efficiency} + \alpha/\text{AveragekWhCost} + \beta\text{FairnessMeasure} \quad (1)$$

where Efficiency represents the portion of load served from renewable energy, AveragekWhCost is the average price of kWh to be paid to the utility according to the evaluated schedule, FairnessMeasure is an output from the Control Level 2 reflecting degree of cost-fairness, $\alpha$ and $\beta$ are constants used to tune the behavior of the control approach. The problem constraints should reflect the deadline requirements and assure that subtasks belonging to the same job always run sequentially. This problem can be solved e.g. with genetic algorithms.

On the other hand, the problem corresponding to Control Level 2 can be formulated with the following objective function:

$$\Sigma_{i,j}|\text{AveragekWhCost}_i/\text{TotalRenewCons}_i - \text{AveragekWhCost}_j/\text{TotalRenewCons}_j| \quad (2)$$

where $\text{AveragekWhCost}_k$ represents the average price that the user k is supposed to pay per kWh for the subtasks currently being scheduled according to the current schedule and power assignment. $\text{TotalRenewCons}_k$ is the total amount of renewable energy used by the user k over the current accounting period, e.g. a month. The problem constraints should reflect that the entire generation of renewable energy within the considered time step is allocated, if demand is greater than the current supply. Again, e.g. genetic algorithms can be used to solve this problem.

For shared energy systems, a mean of fairness is mandatory and cost-fairness together with load balancing has not been considered before this invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for controlling load balancing within an energy system, the method comprising:
providing a renewable energy source for sharing local renewable energy consumption between a predetermined number of users who operate time delay-tolerant loads;
providing a back-up energy source for providing back-up energy to the users in situations in which an energy demand of the users exceeds an availability or a predetermined availability level of renewable energy from the renewable energy source;
defining use cases of appliances of the users by power profiles that are in each case based on a duration and energy consumption of at least one task or an array of subtasks, at least one of the use cases having a user specified deadline;
performing, by a scheduler in a first level, a control of load balancing by at least one of scheduling or time-shifting use of the loads so as to provide a start time assignment for each of the tasks or subtasks based on a maximization of the local renewable energy consumption among the users; and
assigning, by the scheduler in a second level, the renewable energy to the appliances of the users using the start time assignments,
wherein the at least one of scheduling or time-shifting is performed periodically by the scheduler at an adjustable frequency.

2. The method according to claim 1, wherein at least one of a duration, a minimal duration or a maximal duration of a pause between at least two of the subtasks of the use cases is defined by the scheduler.

3. The method according to claim 1, wherein the at least one of scheduling or time-shifting is performed at a level of the subtasks.

4. The method according to claim 1, wherein the scheduler uses future back-up energy prices or dynamic back-up energy pricing schemes to perform the at least one of scheduling or time-shifting.

5. The method according to claim 1, wherein the scheduler uses a prediction or forecast of renewable energy generation of the renewable energy source to perform the at least one of scheduling or time-shifting.

6. The method according to claim 1, wherein the assignment of the renewable energy is performed by the scheduler over a predetermined time interval.

7. The method according to claim 1, wherein the second level considers cost-fairness between the users.

8. The method according to claim 1, wherein at least one of a measure of cost-fairness or the assignment provided within the second level is considered within the first level.

9. The method according to claim 1, wherein the scheduler uses genetic algorithms within at least one of the first or the second level.

10. The method according to claim 7, wherein the cost-fairness comprises the meaning that users with generally equal shares or with generally equal assigned amounts of renewable energy pay on average the same or comparable back-up energy prices.

11. The method according to claim 1, wherein the scheduler is programmed so that the users that consumed less renewable energy than other users get lower prices for back-up energy than the other users.

12. The method according to claim 1, wherein the scheduler uses loads requiring an immediate start to perform the at least one of scheduling or time-shifting.

13. An energy system, wherein a renewable energy source for sharing local renewable energy consumption between a predetermined number of users is provided, wherein a back-up energy source for providing back-up energy to the users is useable in situations in which an energy demand of the users exceeds an availability or a predetermined availability level of renewable energy from the renewable energy source and wherein the users operate time delay-tolerant loads, the energy system comprising:
a scheduler configured to:
define use cases of appliances of the users by power profiles that are in each case based on a duration and energy consumption of at least one task or an array of subtasks, at least one of the use cases having a user specified deadline;
perform, in a first level, a control of load balancing by at least one of scheduling or time-shifting use of the loads so as to provide a start time assignment for each of the tasks or subtasks based on a maximization of the local renewable energy consumption among the users; and
assign, in a second level, the renewable energy to the appliances of the users using the start time assignments,
wherein the scheduler is configured to perform the at least one of scheduling or time-shifting periodically at an adjustable frequency.

* * * * *